United States Patent [19]

Schuhmacher et al.

[11] 4,181,770
[45] Jan. 1, 1980

[54] ISOCYANATE-TERMINATED BRANCHED POLYETHYLENE GLYCOL AND POLYESTER POLYURETHANE FOAMS

[75] Inventors: Günter Schuhmacher, Weinheim; Walter Föttinger, Mannheim; Adolf Gräber; Erich Fahrbach, both of Weinheim, all of Fed. Rep. of Germany

[73] Assignee: Firma Carl Freudenberg, Weinheim, Fed. Rep. of Germany

[21] Appl. No.: 635,185

[22] Filed: Nov. 25, 1975

[30] Foreign Application Priority Data

Nov. 30, 1974 [DE] Fed. Rep. of Germany ....... 2456813

[51] Int. Cl.$^2$ .................... B32B 27/40; C08G 18/77; B32B 31/00; C08G 18/14
[52] U.S. Cl. .................... 428/260; 427/244; 428/290; 428/310; 428/317; 428/425; 521/159; 521/162; 521/901
[58] Field of Search ............... 260/2.5 AD, 2.5 AN, 260/2.5 AP, 2.5 AT, 75 TN, 77.5 AN, 2.5 AT, 2.5 BE; 428/317, 425, 317, 260; 521/901, 159, 162

[56] References Cited

U.S. PATENT DOCUMENTS

| 3,152,162 | 10/1964 | Fischer et al. ................ 260/453 |
| 3,502,601 | 3/1970 | Case et al. .................. 260/2.5 AN |
| 3,748,217 | 7/1973 | May et al. .................... 428/425 |
| 3,775,354 | 11/1973 | Hostettler et al. .......... 260/77.5 AN |
| 3,778,390 | 12/1973 | Ulrich ........................ 260/2.5 AN |
| 3,790,509 | 2/1974 | Diehr ......................... 260/2.5 BF |
| 3,806,473 | 4/1974 | Lombardi et al. ........... 260/2.5 BF |
| 3,806,474 | 4/1974 | Blair .......................... 260/2.5 AG |
| 3,859,162 | 1/1975 | Johnson et al. .............. 260/2.5 BF |
| 3,901,959 | 8/1975 | Allport et al. ................ 260/2.5 AN |
| 3,929,730 | 12/1975 | Graefe et al. ................ 260/2.5 AN |
| 3,962,512 | 6/1976 | Fontana et al. ............... 428/425 |
| 4,006,122 | 2/1977 | Chen et al. .................. 260/75 TN |
| 4,013,701 | 3/1977 | Jabs et al. .................... 260/2.5 AD |

FOREIGN PATENT DOCUMENTS

| 1066759 | 4/1967 | United Kingdom ............. 260/2.5 AD |
| 1429711 | 3/1976 | United Kingdom ................... 521/905 |

OTHER PUBLICATIONS

Hackh's Chemical Dictionary (4th ed.) (McGraw-Hill) (New York) (1969) p. 303.

Primary Examiner—H. S. Cockeram
Attorney, Agent, or Firm—Sprung, Felfe, Horn, Lynch & Kramer

[57] ABSTRACT

A hydrophilic foam is produced by mixing an isocyanate terminated branched polyethylene polyol with a polyester prepolymer and water. The foam may be used to impregnate fabrics, e.g., non-wovens, to produce reinforced sheets of foam of high absorbency and markedly improved abrasion resistance. Preferred polyesters are condensation products of adipic acid plus one or more alkanediols or a polylactone. Other prepolymers may also be included in the mix undergoing foaming, along with conventional additives.

9 Claims, No Drawings

ISOCYANATE-TERMINATED BRANCHED POLYETHYLENE GLYCOL AND POLYESTER POLYURETHANE FOAMS

The invention relates to a hydrophilic polyurethane foam material which is produced by reacting a polyethylene polyol isocyanate adduct and a prepolymer with water.

Hydrophilic absorbent polyurethane adducts are widely known. They are obtained for instance by reacting polyethylene glycol with isocyanates and water. Whereas in general polyurethanes of this kind show a gelatin-like consistency with very low firmness, it is possible to improve this firmness considerably by using branched polyethers with more than two OH-functions for the production of polyurethanes. If such adducts of branched polyethers and toluylene diisocyanate carrying a toluylene diisocyanate radical at the end of each branch (now mono-functional at each branch due to reaction with an OH group) are reacted with water, the amount of water being variable within wide limits which can far exceed the stoichiometric amounts based on the NCO-content, polyurethane foams are produced which are not considerably different in firmness from the generally known polypropylene-oxide based polyurethane foams.

It is known to impregnate flat textile articles such as non-woven fabrics, webs or knits with polyurethane foams whereby products with high absorbency are obtained.

When such a flat textile article is impregnated with a reaction mixture containing polyfunctional NCO-groups, hydrophilic prepolymers and water, products are obtained which are marked by an especially high absorptive capacity for liquids, especially aqueous liquids. The firmness of such articles is largely determined by the fiber skeleton. The resistance to abrasion, for example the scruff resistance of the surface, is influenced by the polyurethane foam.

The abrasion resistance of flat textile articles impregnated with polyethylene glycol based polyurethanes is not adequate for the variety of end uses to which such textiles are put, however. In order to improve the properties, to the prepolymer comprising a branched polyfunctional polyethylene polyol isocyanate adduct there has been added a prepolymer of polytetramethylene glycol ether and toluylene-diisocyanate. From this mixture of two polyether-isocyanate prepolymers and water a polyurethane foam was formed which, however, did not have the desired properties. Above all, the hydrophilicity and the high water absorbency were considerably reduced. Also the elasticity, which is characteristic of polyurethane foams, was considerably reduced.

It is therefore an object of the invention to provide a polyurethane foam which is hydrophilic and has a high water absorbency which is desired, for example, when the polyurethane foam is used to impregnate flat textiles which are to be used as absorbent cloths, for instance household wash cloths. From the foregoing discussion it is clear that known polyurethanes either have disadvantages as to their hydrophilic properties or do not show the required abrasion resistance for such an end use.

This object is realized in accordance with the present invention by forming the polyurethane from a prepolymer mixture comprising a branched polyethylene polyol which is -NCO terminated and a polyester prepolymer, plus water. The foam may be used to impregnate flat textile articles such as non-woven fabrics, webs or knits.

Tests have shown that a considerable improvement in the firmness and scruff resistance properties is achieved by admixing polyester prepolymers having isocyanate end groups with the branched polyethylene polyol ether isocyanate adducts. The polyurethane foams produced with these mixtures and water show not only the desired improved scuff resistance but also show a good hydrophilicity and high water absorbency as well as a very fine cell structure.

In many cases it is suitable to use a polyester as polyol component which has been chain-lengthened with isocyanates in such proportion of polyester to diisocyanate that the end groups of the formed prepolymers are isocyanate groups. The prepolymers are then transformed in the known manner with water into polyurethane foams of high firmness and elasticity as well as high abrasion resistance and very good water absorbency.

As polyester according to the invention there may be employed polycondensation products of at least one dicarboxylic acid, for instance adipic acid, and at least one glycol, e.g. ethylene glycol, 1,2-propanediol, 1,3-propanediol, 1,4-butanediol, neopentylglycol, 1,6-hexanediol and the like. Also suitable are polyesters produced by self-condensation of lactones, e.g., ε-caprolactone.

Polyisocyanates are proposed such as for instance di- and triisocyanates such as toluylene-diisocyanate, 4,4'-diphenylmethane diisocyanate, 1,5-naphthalene-diisocyanate, 1,6-hexamethylene-diisocyanate, isophorone-diisocyanate, triphenyl-methane-triisocyanate, the addition product of one mole of trimethylolpropane and 3 moles of toluylene-diisocyanate and one mole of water, or similar substances.

The prepolymers or prepolymer mixtures may be mixed with known additives such as catalysts, cell regulators, cross linking agents, and the like.

The invention will be further described in the following illustrative example wherein all parts are by weight unless otherwise expressed.

EXAMPLE

To 100 parts of a prepolymer of a branched polyethylene glycol ether with NCO-end groups there are added 40 parts of a prepolymer made from 100 parts of a poly-ethylene glycol adipate having a molecular weight of 2000 and 34 parts of a liquid 4,4'-diphenyl-methane-diisocyanate/polycarbodiimide condensation product with a 30% NCO-content. The prepolymer mixture is mixed with 125 parts of water and stirred intensively for 20 seconds. The foamed and reinforced product has a very fine cell structure and a dry abrasion resistance which is 4 times higher than a corresponding foam without the polyester adduct additive.

The high volume of water absorption as well as the suction velocity is not changed markedly compared to a foam produced from only a branched ethylene glycol ether polymerizate.

In other tests 20 and 60 parts of polyester prepolymer were added instead of 40 parts. In these tests, too, an improvement in abrasion resistance was realized but not, however, to the same degree.

The dry abrasion resistance was determined by means of an apparatus known as the "Frank-Hauser-flat abrasion tester." A testing surface of 29.2 cm² was subjected to 500 revolutions with an abrasive paper (corundum type, graining 220) under a load of 1000 g and an accurate pressure of 500 mmWs. With this apparatus, a conventional product comprising a non-woven fabric impregnated with a foam built up of only polyether prepolymers, and not containing polyester prepolymers, lost 427.3 g/m² of foam through abrasion. The same non-woven fabric impregnated with the foam according to the example, i.e., polyether and polyester prepolymer-containing polyurethanes, showed a dry abrasion loss of only 109.5 g/m².

The dry abrasion resistance of the product according to the invention is thus about 4 times as high as the conventional product.

It will be appreciated that the instant specification and claims are set forth by way of illustration and not limitation, and that various modifications and changes may be made without departing from the spirit and scope of the present invention.

What is claimed is:

1. A hydrophilic sheet of polyurethane-based foam comprising the product of reacting in the presence of water (A) a major amount of an isocyanate terminated branched polyethylene polyol prepolymer, (B) a minor amount of an isocyanate terminated polyester-diol prepolymer, and (C) a minor amount of a liquid 4,4'-diphenylmethane-diisocyanate/polycarbodiimide condensation product with a 30% NCO content.

2. A sheet according to claim 1, having a textile reinforcement.

3. A sheet according to claim 2, wherein said textile is a non-woven fabric.

4. A process for the production of a hydrophilic foam by mixing and reacting in the presence of water (A) a major amount of an isocyanate terminated branched polyethylene polyol prepolymer, (B) a minor amount of an isocyanate terminated polyester-diol prepolymer, and (C) a minor amount of a liquid 4,4'-diphenylmethane-diisocyanate/polycarbodiimide condensation product with a 30% NCO content.

5. The process according to claim 4, comprising the additional step of pouring the mix over a textile fabric thereby to form a fabric-reinforced foam.

6. The process according to claim 5, wherein said fabric is a non-woven fabric.

7. The process according to claim 4, wherein said isocyanate-terminated branched polyethylene polyol and said isocyanate-terminated polyester-diol prepolymer are the respective reaction products of a branched polyethylene polyol and of a polyester diol with at least one diisocyanate selected from the group consisting of toluylene-diisocyanate, 4,4'-diphenylmethane diisocyanate, 1,5-naphthalene-diisocyanate, 1,6-hexamethylene-diisocyanate, isophorone-diisocyanate, triphenylmethane-triisocyanate, and condensation products thereof, and said polyester-prepolymer is at least one member selected from the group consisting of a polylactone and a condensation product of dicarboxylic acid and a glycol.

8. The process according to claim 7, wherein said polyester is the condensation product of adipic acid and at least one glycol selected from the group consisting of ethylene glycol, propanediol, butanediol, pentanediol, neopentylglycol and hexanediol.

9. The process according to claim 8, comprising the additional step of pouring the mix over a non-woven fabric thereby to form a fabric-reinforced foam.

* * * * *